Jan. 29, 1935.  F. A. PARSONS  1,989,335
MIXING VALVE
Filed June 26, 1930
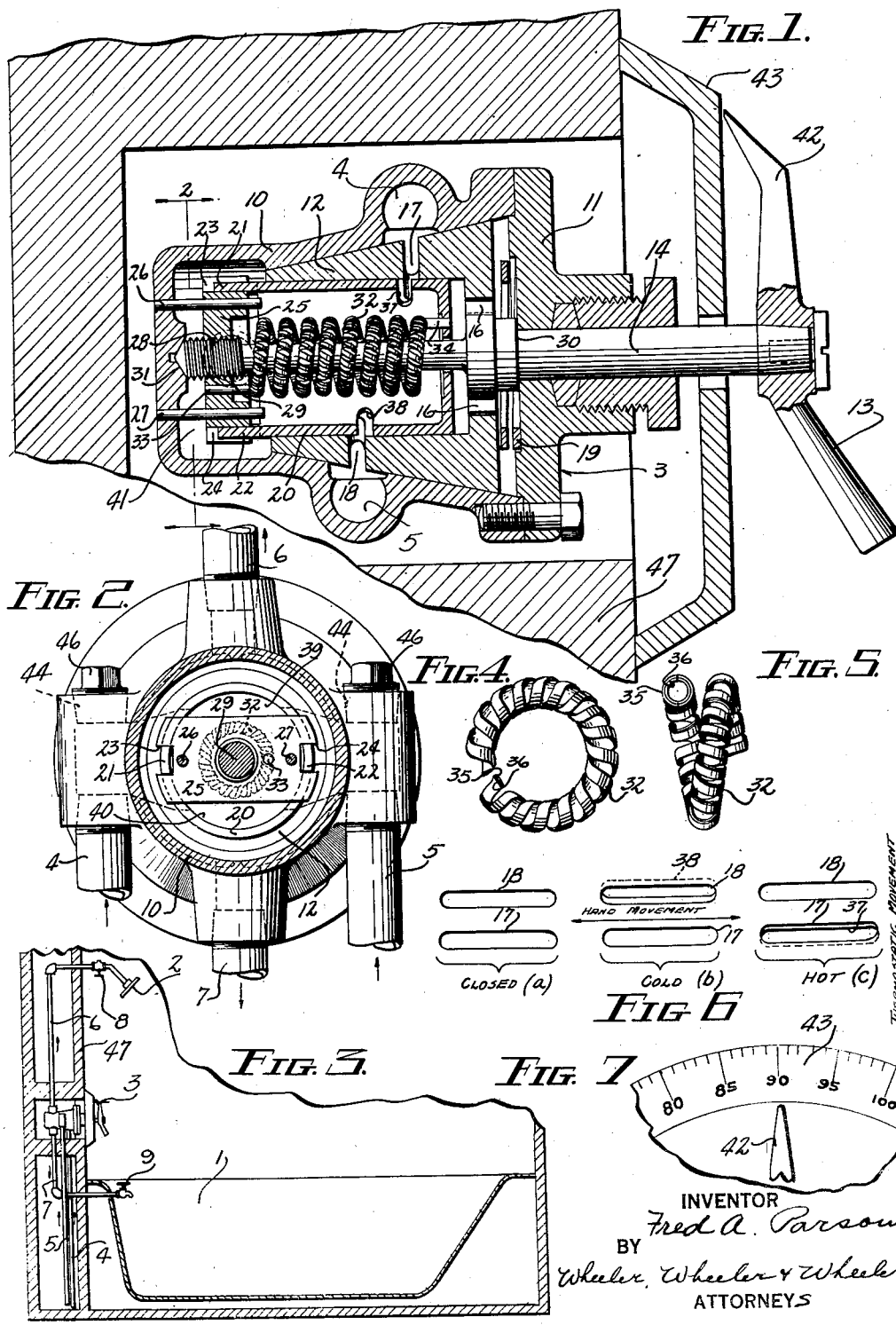
INVENTOR
Fred A. Parsons
BY
Wheeler, Wheeler & Wheeler
ATTORNEYS Patented Jan. 29, 1935

1,989,335

UNITED STATES PATENT OFFICE 1,989,335

MIXING VALVE

Fred A. Parsons, Milwaukee, Wis.

Application June 26, 1930, Serial No. 463,976

19 Claims. (Cl. 236—12)

This invention relates to mixing valves. Although the invention has general application in many aspects, it pertains particularly to the construction and arrangement of valve devices for controlling the temperature and volume of water supplied to appliances such as bath tubs and shower heads from hot and cold water mains.

A purpose of the invention is to provide a valve device adapted to receive fluid from hot and cold supply channels, either from the one or the other or simultaneously from both, and having means for manually adjusting the valve to various positions determinative of different temperatures of fluid delivery mixture, and also means adapted automatically to substantially maintain a desired temperature irrespective of variations, within certain limits, of the temperature or pressure of the fluid in the different supply channels.

A further purpose is to provide such a valve having automatic means to completely close the supply channels, or at least the hot supply channel, in the case that the temperature of the delivery mixture is higher than a predetermined maximum.

A further purpose is to provide a semi-automatic or automatic mixing valve in an improved arrangement for alternatively supplying either or both of two devices such as a bath tub and a shower head.

Another purpose is to provide an improved form of temperature responsive automatic control element and particularly such an element of a form adapted for obtaining a relatively large response to a given temperature change while occupying a relatively small space, and more particularly such an element of a form substantially similar to a helical spring and adapted to change its free axial length in accordance with changes in its temperature or in the case that the element is axially confined, adapted to change the axial pressure in accordance with changes in its temperature.

Another purpose is to provide a mixing valve having automatic temperature control features and of a construction particularly adapted for an improved and convenient form of such valve, suitable for being positioned within the relatively thin partition wall of a building structure yet easily accessible as to its interior or working mechanism for purposes of adjustment or repairs.

Another purpose is generally to simplify and improve the construction and operation of mixing valves and of the combination of such valves with devices to be served with fluid mixed thereby, and still other purposes will be apparent from this specification.

The invention consists in the construction and combination of parts as herein illustrated, described and claimed and in such modifications of the structure shown and described as may be equivalent to the claims.

In the drawing the same reference characters have been used to designate the same parts in each view of which Figure 1 is a horizontal axial section of a mixing valve which includes the invention.

Figure 2 is a rear elevation of the same valve with portions of associated piping, and partly in section along line 2—2 of Fig. 1.

Figure 3 is a view partly in section and to a reduced scale shown in Fig. 1 and other valves and piping arranged to serve either a bath tub or a shower head or both.

Figure 4 is an enlarged view of one coil of a thermostatic element shown in Fig. 1.

Figure 5 is an enlarged side view of the coil shown in Fig. 4.

Figure 6 is a diagrammatic view of various positions of relatively movable elements shown in Fig. 1.

Figure 7 is a partial view of a dial or chart.

The view in Figure 3 shows a plurality of devices including a bath tub 1, a shower head 2, a mixing valve of special construction as later described and generally denoted by the number 3, a hot water supply pipe or channel 4, a cold water supply pipe or channel 5, outlet pipes 6—7 respectively leading to the shower head 2 and to the tub 1, and valves 8—9 of usual or any suitable construction to open or close the supply pipes to the shower head 2 and to the tube 1 respectively.

The mixing valve 3 is of the following construction. A casing or housing 10 is of generally cylindrical form as shown in Fig. 2 and is provided with a removable cover or plate 11 fixed thereon by the means of bolts or screws. A sleeve or member 12 having a tapered cylindrical or conical exterior is rotatable in a complementary conical bore in casing 10 by the means of a hand lever 13 fixed on a shaft 14 having an enlarged portion provided with peripheral keys or extensions 16—16 slidably engaging complementary slots or sockets in the member 12.

The hot and cold channels 4—5 communicate with the interior of casing 10 and with channels or ports 17—18 respectively and in a manner such that the channels 17—18 are supplied from the channels 4—5 through preferably about half of a revolution of member 12, but during another portion of the revolution the channels do not communicate and the supply of water is completely cut off. A relatively large total of angular movement of member 12 is obtained while preserving the cut-off feature aforesaid by offsetting the ports 17—18 along the axis of member 12. It is partly to insure a permanently water tight fit of member 12 in the casing that the member is tapered, and for the same purpose there is provided a spring 19 continuously urging the member into its tapered seat.

A sleeve or member 20 is slidably guided in an axial bore in the member 12 but is prevented from rotation by means of ears or key lugs 21—22 engaging with complementary slots or sockets 23—24 in a member 25, which in turn is prevented from rotation by the means of pins or key members 26—27 fixed with casing 10 and slidably fitted in complementary bores or sockets in the member 25. Member 25 is in threaded engagement at 28 with an extension or shank 29 of the shaft 14. The shaft 14 is prevented from axial movement by a shoulder 30 engaging the cover plate 11 and an abutment 31 engaging the casing 10, whereby the member 25 is moved axially of the shaft 14 when the shaft and member 12 are rotated.

Member 20 is made to move axially with respect to the member 25 by means of a thermostatic element 32 fixed at its opposite ends with the respective members by any suitable means. In this instance the spring has an anchorage peg 33 engaging a socket or bore in member 25 and a similar peg 34 engaging a socket or bore in member 20.

Thermostatic element 32 is of the structural form best shown in Figs. 4 and 5. It will be noted that the general form is that of a helical spring fastened at axially opposite ends to the members 20, 25 and in which the coils are or may be formed by first winding a minor helix, in this case of relatively small diameter, out of a narrow strip of well known bi-metallic metal, comprising two integrally joined strips or sheets of different metals, preferably resilient and necessarily having different co-efficients of thermal expansion. The minor helix mentioned is so wound that one metal lies outside the coils and the other inside the coils, the different metals being indicated at 35—36 Fig. 5.

The minor helix is then itself wound helically to comprise a major helix, resulting in the general form of a helical spring. A bi-metallic spring so made will expand or contract in the direction of the axis of the major helix when the temperature of the structure is changed. It may be stated that the described result in the major helix is due to the fact that the winding of the minor helix is such as to produce a torsional or twisting effect along the axis of the minor helix when the temperature changes. In accordance as the one or the other metal is positioned outside or inside of the minor helix the major helix will expand or contract along its axis when heated.

The member 20 is provided with ports or openings 37—38 having positions relative to the ports 17—18 such that during the rotation of the member 12 from the position in which the fluid supply is completely shut off, the port 18 will, in a certain position of member 12, be fully in communication with port 38, after which during the continued rotation of member 12 port 18 will gradually move out of communication with port 38 and at the same time port 17 moves into communication with port 37 until at the end of the rotation of member 12, the ports 18—38 do not communicate but ports 17—37 are in full communication.

Such relative movement is shown diagrammatically in Fig. 6 in which, for convenience the different relative angular spacing of the ports is neglected and positions a—b—c respectively represent the closed, the cold and the hot positions of member 12.

The water received through one or both ports 37—38 passes over the thermostatic element 32 along the axial bore in member 20 to the left in Fig. 1 and out through either the channel 6 or channel 7 or both, accordingly as the valves 8—9 are positioned, there being openings 39—40 (Fig. 2) for passage into a chamber 41 (Fig. 1) in the casing 10 and each of the channels 6—7 communicating with the chamber.

The temperature of the water thus delivered to channels 6—7 varies in accordance with the position of member 12 between the cold and hot positions b—c, Fig. 6, thus resulting in a change in the axial length of member 32 as previously described. If the temperature and pressure of the water in the supply channels 4—5 were maintained constant, then each position of member 12 would result in a predetermined temperature of water mixture and in a predetermined axial length of element 32. The screw thread at 28 is of a pitch just sufficient that in such case the relative axial positions of members 12—20 would be maintained constant. A pointer or indicator 42, fixed to move with shaft 14, reads against suitable graduations on a member 43 and forming a chart of temperatures as shown in part in Fig. 7, the graduations being in accordance with the temperatures resulting from the different positions of member 12 when the supply temperatures and pressures are constant at predetermined values.

It will be observed that in this device changes of output temperature are not secured by a mere adjustment of the thermostat. The control is primarily effected through manipulation of valve 12, and the function of the thermostatically controlled valve member 20 is simply to compensate for changes in pressure or temperature of either or both of the two sources which might otherwise affect the output given by the setting of the manually controlled member 12. Since the thermostatically controlled movement between the valve members is in the direction of the narrow cross section of the ports, the thermostatic member will function with a high rate of change but the range through which it will operate is necessarily limited. If the manually controlled valve member were adjusted through a wide range of temperatures the resulting expansion or contraction of the thermostatic element might be so great that the thermostatic valve member 20 would be moved out of the range in which its ports would register effectively with those of member 12. Thus the screw threaded connection between the valve stem and the base member 25 to which the thermostat is connected is purely compensatory to readjust the base for each change of length to which the thermostatic element may be subjected by a change in the setting of the manual valve member 12, the net result being that so long as the pressure and temperature of the sources remain constant the thermostatically controlled valve member 20 will tend to assume a predetermined position regardless of the extent to which the manually operable member 12 is adjusted to produce temperature variation in the output.

If, however, the pressure, or temperature of either supply source changes, the temperature of the mixture also changes and the arrangement and relative ports 17—37 and 18—38 is such that the resulting axial movement of the thermostatic element 32 and sleeve 20 tends to restore or maintain the temperature of the mixture in spite of such changes in the supply. If for instance the mixture becomes hotter the themostatic element contracts axially as previously explained, thus shifting the member 20 to the left in Fig. 1 and simultaneously restricting the hot water port and further opening the cold water port.

It may be stated that no device operative as above can completely compensate for variation in pressure and temperature of the source as will appear from the following analysis.

Assuming, first, that a temperature of say 80 degrees is desired, and that the temperature and pressure of the supply sources is adapted to give such temperature when the thermostatic element is at 80 degrees and the index pointer is set at an 80 degree position. Thus if the pressure or temperature of either supply source changes, the member 20 should be shifted by the thermostatic element 32 to change the relative area of the openings from the different sources. But should the thermostatic element come back to 80 degrees the member 20 would again occupy its original position and the relative area of outlet would against be wrong for the changed temperature or pressure of supply. What will evidently occur is that the temperature change will be only partially compensated and a final temperature of the mixture will be reached which will approach more nearly to the desired temperature than if the thermostatic element were not present, yet will not and cannot be exactly 80 degrees, unless the original temperature and pressure of both the supply sources are restored.

It will be evident however that the greater the change in relative area of opening which is effected by a given temperature change in the thermostatic element, the more nearly will the temperature of the mixture be maintained at the desired level.

The present device is particularly adapted to effect a large compensating effect with relatively small change in the temperature of the thermostatic element. The thermostatic deflection being at right angles to the manual adjusting movement the ports may be and are relatively very narrow in the direction of thermostatic movement. This would not otherwise be possible while still maintaining desired accuracy of hand adjustment. Also the form of thermostatic element is such as to give relatively great movement. Also the construction is such that the members shifted by the thermostatic element move very easily whereby bi-metallic metal having relatively large thermostatic effect may be used.

It is to be noted that in the case that the mixture for any reason becomes too hot, the member 20 will be shifted to completely close both port openings, which safeguards the user against scalding, if for instance steam or too hot water should be accidentally admitted to either supply channel.

The supply pipes or channels 4—5 are here shown as attached from underneath the valve 3, but openings 44—45 are provided for attaching either or both supply pipes from above. The openings not in use are closed by suitable means such as plugs 46, Fig. 2, and similar plugs may be used for either outlet opening in case only one outlet is desired.

The general form of the structure of valve 3 is such as to be completely housed within a partition wall such as 47, Fig. 3. The only opening in such wall is the opening required to remove the cover plate 11, which when removed permits access to or removal of all the working parts of the device, and such opening is completely concealed by the member 43.

I claim:

1. In combination, a mixing valve chamber provided with laterally projecting heads each having upper and lower inlet openings, each of said heads having an internal passage communicating with the interior of said chamber and the upper and lower inlets of the respective head, valve means co-acting with said passages and determinative of the relative openings thereof, a thermostatic member controlling said valve means and disposed in the path of liquid admitted through said passage, an outlet opening from the interior of said chamber, pipes communicating with certain of said openings, and plugs for the other openings.

2. A mixing valve comprising the combination with a chamber provided with a plurality of inlet ports, of a plurality of ported valve members co-acting with each other and the ports of the chamber and movable in directions at right angles to each other.

3. A mixing valve comprising the combination with a chamber provided with a plurality of inlet ports, of a plurality of ported valve members co-acting with each other and the ports of the chamber and movable in directions at right angles to each other, one of said valve members being manually controlled and the other being provided with a thermostatic control device, the ports of said valve members being relatively narrow in the direction of relative thermostatic movement and elongated in the direction of relative manual movement.

4. In a mixing valve the combination with a chamber provided with a plurality of inlet ports, of a plurality of co-axial sleeves within said chamber constituting valves adapted to co-act with the ports of said chamber and with each other for the regulation of relative rates of fluid admission through said ports, one of said sleeves being axially movable and the other rotatably movable.

5. In a mixing valve the combination with a chamber provided with a plurality of inlet ports, of a plurality of co-axial sleeves within said chamber constituting valves adapted to co-act with the ports of said chamber and with each other for the regulation of relative rates of fluid admission through said ports, one of said sleeves being axially movable and the other rotatably movable, said ports being so spaced and said sleeves so formed that in a given position of the sleeves both ports will be opened and a movement of either sleeve in either direction will constrict one port with respect to the other.

6. In a mixing valve the combination with a chamber provided with a plurality of inlet ports, of a plurality of co-axial sleeves within said chamber constituting valves adapted to co-act with the ports of said chamber and with each other for the regulation of relative rates of fluid admission through said ports, one of said sleeves being axially movable and the other rotatably movable, said ports being so spaced and said sleeves so formed that in a given position of the sleeves both ports will be open and a movement of either sleeve in either direction will constrict one port with respect to the other, one of said sleeves being manually operable and the other being provided with a thermostatic control member exposed to the action of fluids entering said chamber through said ports.

7. In a valve structure, the combination of a pair of flow controlling members, and means supporting said members for relative movement in each of two distinct directions, said members having complementary ports registerable in one position of relative movement of said members, each of said ports being narrow in one direction of relative movement of said members and greatly elongated in the other direction of relative movement therebetween.

8. In a valve structure, the combination of a pair of flow controlling members, and means supporting said members for relative movement in each of two distinct directions, said members having complementary ports registerable in one position of relative movement of said members, each of said ports being narrow in one direction of relative movement of said members and greatly elongated in the other direction of relative movement therebetween, together with means for thermostatically effecting relative movement between said members in the direction in which said ports are narrow, and means for manually effecting relative movement between said members in the direction in which said ports are elongated.

9. In a mixing valve, the combination with a ported casing, of means controlling the admission of liquids into said casing through a plurality of ports therein, said means comprising a valve member having elongated ports and provided with means for manually adjusting said member with respect to said casing in the direction in which said valve member ports are elongated, and means including a thermostat exposed to the mixed discharge into said casing through both of said ports for inversely varying the discharge through said ports in any given position of said member.

10. In a mixing valve, the combination with a ported casing, of means controlling the admission of liquids into said casing through a plurality of ports therein, said means comprising a valve member having elongated ports and provided with means for manually adjusting said member with respect to said casing in the direction in which said valve member ports are elongated, and means including a thermostat exposed to the mixed discharge into said casing through both of said ports for inversely varying the discharge through said ports in any given position of said member, said means being operative to vary the effective width of the ports of said member through which discharge into said casing takes place.

11. In a mixing valve, the combination with a chamber having a plurality of inlet ports, of a single manually controlled valve member provided with elongated slots registering with said ports, and a single thermostat exposed to the mixed effluent from said ports and provided with means for simultaneously varying the effective discharge area thereof, said means being operative in a direction other than that in which said valve member is moved manually.

12. In a mixing valve, the combination with a plurality of relatively movable members each having a plurality of ports, and a chamber into which the effluent from said ports is receivable, of manually operable means for effecting relative adjustment of said members in one direction for simultaneous regulation of the effective areas of the respective ports through said members, and a single thermostatic means exposed within said chamber to the mixed effluent of said ports and provided with connections for effecting relative movement between said members in a different direction, whereby simultaneously to vary inversely the effective areas of the respective ports.

13. In a mixing valve, the combination with a plurality of relatively movable members each having a plurality of ports, and a chamber into which the effluent from said ports is receivable, of manually operable means for effecting relative adjustment of said members in one direction for simultaneous regulation of the effective areas of the respective ports through said members, and a single thermostatic means exposed within said chamber to the mixed effluent of said ports and provided with connections for effecting relative movement between said members in a different direction, whereby simultaneously to vary inversely the effective areas of the respective ports, said ports being elongated in the direction of relative manual movement of said members and being comparatively very narrow in the direction of relative thermostatic movement.

14. A mixing valve comprising the combination with a ported chamber and a plurality of valve members movable at right angles across the port of said chamber, of means for manually operating one of said members and means for thermostatically operating the other, the port of said chamber being elongated in the direction of operation of the manually operable member and relatively very short in the direction of operation of the thermostatically actuated member.

15. A mixing valve comprising the combination with a casing provided with a plurality of circumferentially elongated inlet ports, of a ported sleeve rotatably associated with said casing and provided with circumferentially elongated ports complementary to those of the casing, means for the manual manipulation of said sleeve, and a second sleeve having similarly complementary ports co-acting with the ports of said casing and provided with a thermostatic member disposed within the casing and adapted to actuate the second sleeve in an axial direction across the short dimensions of said ports.

16. In a mixing valve the combination with a casing having circumferentially elongated ports, of a relatively rotatable valve member tightly fitted to said casing and provided with complementary ports similarly elongated, said valve member being manually adjustable to vary the relative openings of said ports and movable to a position in which both ports are closed, and a sleeve within said casing provided with a thermostatic regulating device, said last mentioned sleeve being loosely mounted for free response to its thermostat and adapted to obstruct the ports of said casing sufficiently to modify flow therethrough supplementally to the action of the manually controlled member.

17. In a mixing valve, the combination with a casing having a plurality of inlet ports, of a first valve means for proportioning flow into said casing from the respective ports and adjustable to different settings to give a plurality of output temperatures constant for each setting so long as the pressure and temperature of fluid admitted through said sources remain constant, and a second valve means provided with a thermostat exposed to temperatures of the mixture of fluids within said casing and including mechanism for operatively proportioning the flow through said inlet ports in a direction to compensate for temperature changes produced in said casing by changes in temperature or pressure of the fluid admitted through either of said ports, a base with which said thermostat is connected, and means for adjusting said base in accordance with the movement of said first valve means in a direction to adjust said thermostat in compensation for temperature changes produced by adjustment of said first valve means, whereby the range of movement of said second valve means will be substantially the same irrespective of the temperature to which said first valve means is set and said thermostat is exposed.

18. In a mixing valve, the combination with a pair of ported valve members relatively movable in each of two distinct directions with respect to each other, of a first means for effecting relative movement between said members in one direction, thermostatic means for effecting relative movement between said members in the other of said directions, an adjustable base to which said thermostatic means is connected, and motion transmitting connections between said first means and said base for the adjustment of the thermostatic means in a direction and to a degree compensatory for changes of said thermostatic means produced by the relative adjustment of said members by said first means, whereby the range of movement of said members under the control of said thermostatic means will always be substantially the same irrespective of the range of temperatures controlled by said members.

19. In a mixing valve, the combination with a ported casing providing a tapered seat intersected by at least two ports, of a manually operable valve member complementary to said seat and rotatable thereon, said valve member being peripherally slotted, means holding said valve member to its seat, a second valve member axially slidable within the first valve member and provided with slots complementary thereto, means restraining said second valve member from rotation, whereby the rotation of the first valve member under manual control will occasion the overlapping of the slots of said members in a peripheral direction to a greater or less degree whereby to proportion flow therethrough, a thermostat base provided with means for its adjustment, a thermostat connected with the base and with the second valve member for the axial adjustment thereof, whereby to effect compensatory proportioning of flow through said slots by offsetting or registering said slots in an axial direction, said adjustment means for the base being operatively connected with said first valve member and adapted to effect an axial adjustment of said base and thermostat in a direction compensatory for temperature changes effected by said first valve member, whereby the range of axial adjustment of said second valve member will be substantially constant irrespective of the temperatures for which the said first valve member may be adjusted.

FRED A. PARSONS.